United States Patent
Chou

(10) Patent No.: US 6,419,433 B1
(45) Date of Patent: Jul. 16, 2002

(54) SECURING NET

(76) Inventor: An-Chuan Chou, No. 212, Yung An Street, Tainan (TW)

(*) Notice: Subject to any disclaimer, the term of this patent is extended or adjusted under 35 U.S.C. 154(b) by 0 days.

(21) Appl. No.: 09/729,745

(22) Filed: Dec. 6, 2000

(51) Int. Cl.$^7$ .................................................. B60P 7/08
(52) U.S. Cl. ........................................ 410/97; 410/118
(58) Field of Search ............................ 410/96, 97, 100, 410/117, 118; 87/2; 248/499; 296/100.15, 100.16

(56) References Cited

U.S. PATENT DOCUMENTS

| | | | | |
|---|---|---|---|---|
| 2,455,237 A | * | 11/1948 | Davis .......................... 410/97 |
| 2,696,360 A | * | 12/1954 | Toffolon ................... 410/97 X |
| 3,173,539 A | * | 3/1965 | Looker ..................... 410/97 X |
| 4,168,667 A | * | 9/1979 | Loomis ...................... 410/118 |
| 4,265,577 A | * | 5/1981 | Loomis ...................... 410/118 |
| 5,050,924 A | * | 9/1991 | Hansen ..................... 410/97 X |
| 5,328,310 A | * | 7/1994 | Lockney ...................... 410/97 |
| 5,876,167 A | * | 3/1999 | Selby .......................... 410/97 |
| 5,924,611 A | * | 7/1999 | Mizuno .................. 410/118 X |
| 6,017,174 A | * | 1/2000 | Ross et al. .................. 410/100 |
| 6,099,221 A | * | 8/2000 | Takagi .......................... 410/97 |
| 6,152,664 A | * | 11/2000 | Dew et sl. .................. 410/100 |
| 6,217,268 B1 | * | 4/2001 | Chou .......................... 410/97 |

* cited by examiner

*Primary Examiner*—Stephen T. Gordon
(74) *Attorney, Agent, or Firm*—Rosenberg, Klein & Lee

(57) ABSTRACT

A securing net for luggage has a fine net, a main net and hooking elements. The fine net is disposed in the middle. The main net is made of a rope having a first part arranged to from several spaced apart shaped loops each having an inner end portion connected to an outer part of the fine net; the rope having a second part arranged across intermediate portions of the shaped loops, approaching the fine net with fixing elements coupled to intersections of the rope. The hooking elements are coupled to an outer part of the main net for connecting the securing net to a luggage rack. The securing net can secure small objects on the luggage rack of a station wagon by means of the fine net.

2 Claims, 3 Drawing Sheets

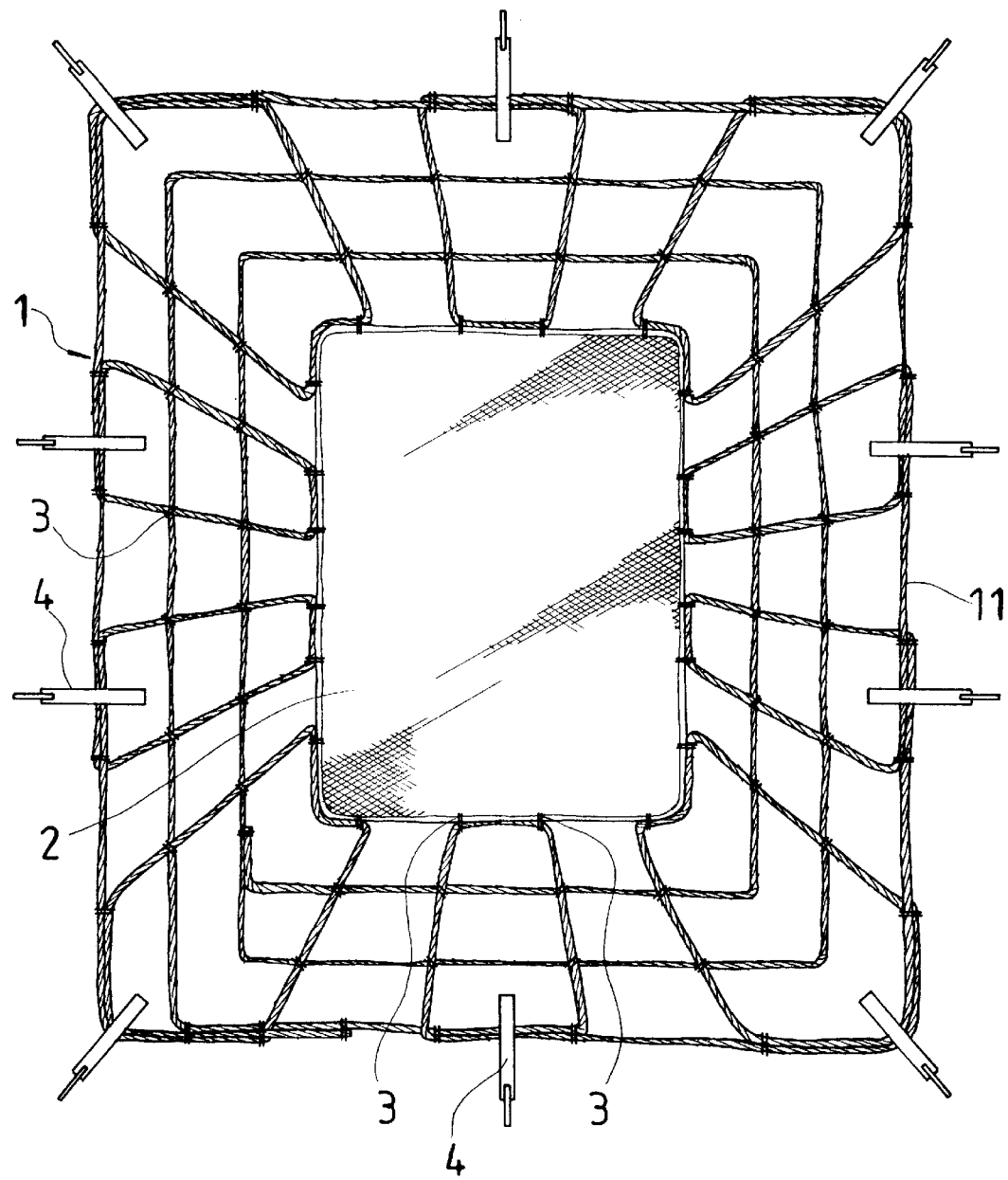
F I G. 1

SECURING NET

BACKGROUND OF THE INVENTION

The present invention relates to a securing net for luggage, and particularly to one which is used to secure luggage to the luggage rack on the top of a station wagon, jeep, etc.

Station wagons and jeeps can carry luggage on the luggage rack on the top, and nets are used to secure the luggage to the rack; thus, the station wagons and the jeeps can carry more luggage.

Referring to FIG. 3, a conventional securing net for luggage has a central ring, several transverse ropes 30, several longitudinal ropes 20, fixing elements 40 and hooking elements 50.

The transverse ropes 30 are disposed around the central ring 10, each forming a circle; two ends of each of the transverse ropes 30 are connected to each other with the fixing elements 40.

The longitudinal ropes 20 are radially spaced apart, and each connected to the central ring 10 from an inner end portion, and connected to an outermost one of the transverse ropes 30 from an outer end portion with the fixing elements 40; referring to FIG. 4, the inner end portions of the longitudinal ropes 20 each forms a loop 201 around the central ring, and is connected to a respective fixing element 40.

The hooking elements 50 are coupled to the outermost transverse ropes 30 for permitting the net to be connected to a luggage rack of a station wagon. Thus, the securing net can be fastened to the luggage rack by the hooking elements 50 to secure the luggage on the rack.

However, because the central ring 10 has a central space, small objects, which are usually placed on the upper portion of the luggage are likely to fall off the rack from the central space of the central ring 10.

SUMMARY OF THE INVENTION

Therefore, it is a main object of the present invention to provide a securing net for luggage which can secure small objects placed on the upper portion of the luggage.

The securing net for luggage of the present invention includes a fine net, a main net and hooking elements.

The fine net is disposed in a middle portion of the securing net. The main net is made of a rope, the rope having a first part arranged to form several spaced apart shaped loops each having an inner end portion connected to the outer part of the fine net; the rope having a second part arranged across intermediate portions of the shaped loops, approaching the fine net with fixing elements coupled to intersections of the rope.

Thus, the securing net can secure small objects on the luggage rack by means of the fine net, preventing the small objects from falling off the rack.

BRIEF DESCRIPTION OF THE DRAWINGS

This invention will be better understood by referring to the accompanying drawings, wherein:

FIG. 1 is a view of the securing net for luggage according to the present invention.

DESCRIPTION OF THE PREFERRED EMBODIMENTS

Figure 2:
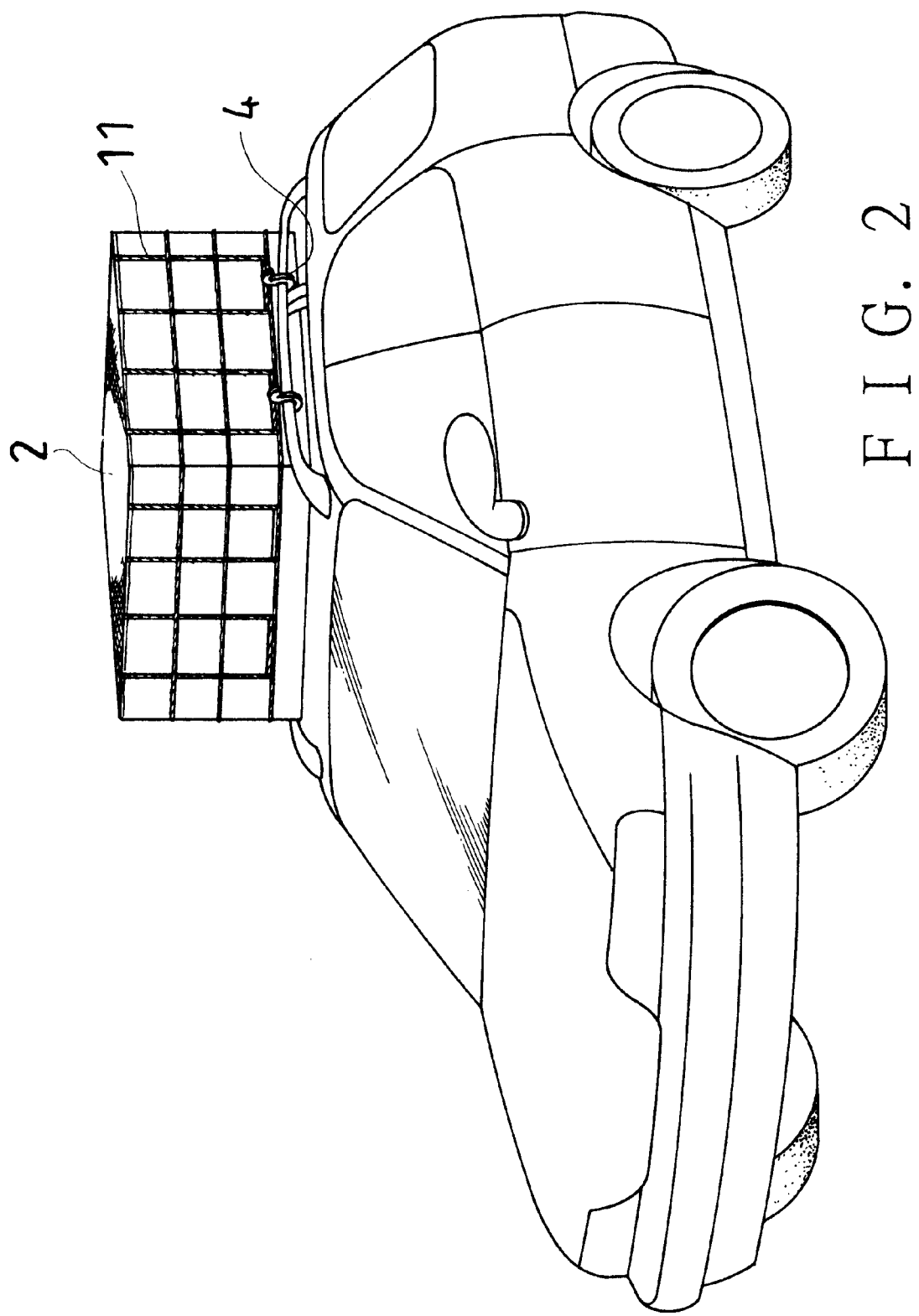
FIG. 2 is a view showing the securing net of the present invention being used on a luggage rack.
Figures 3, 4:
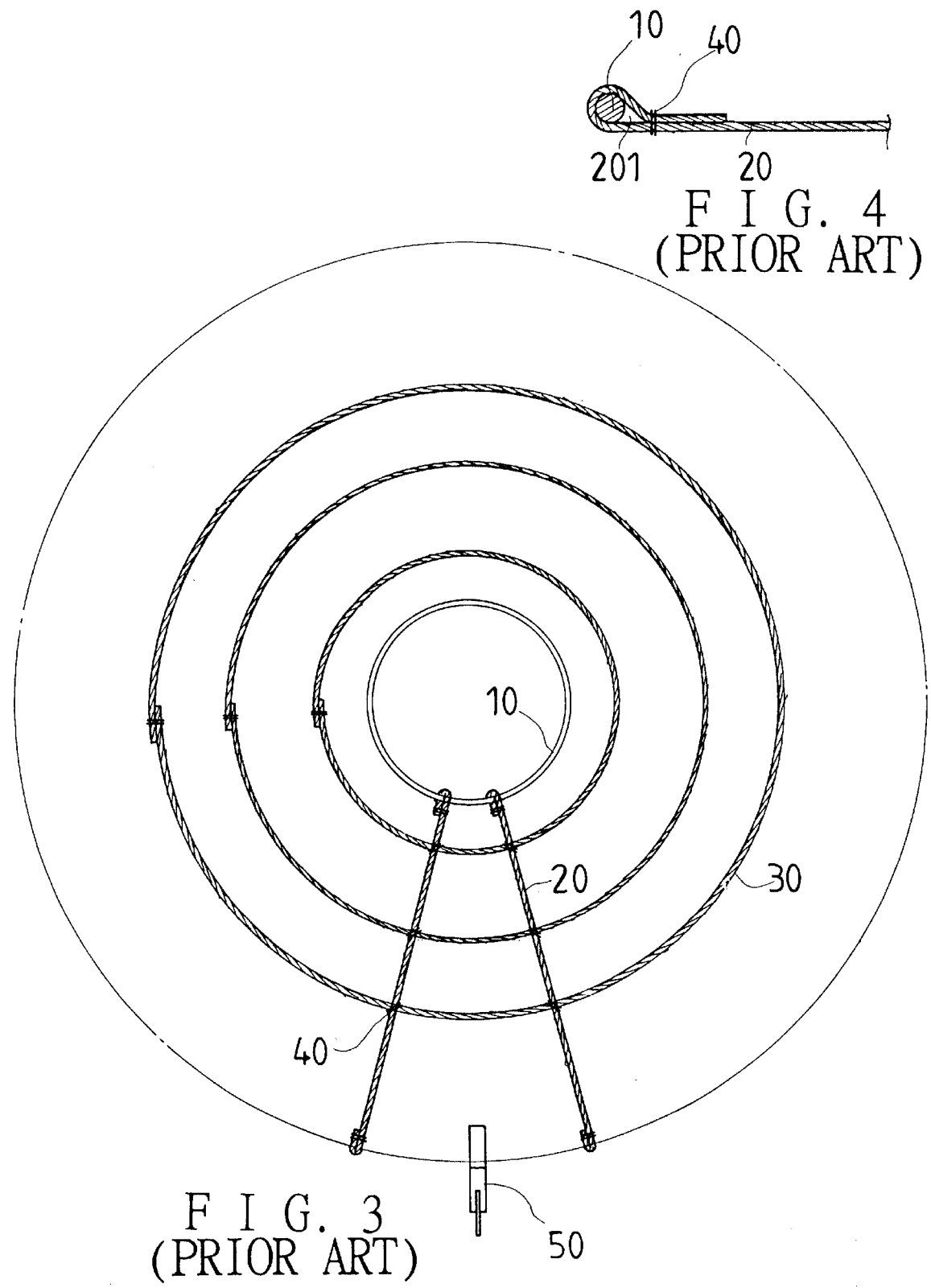
FIG. 3 is a view of the conventional securing net in the Background.
FIG. 4 is a fragmentary cross-sectional view of the conventional securing net.

Referring to FIG. 1, a securing net for luggage of the present invention includes a main net 1, a fine net 2 and hooking elements 4.

The fine net 2 has small meshes, and is disposed in the middle portion.

The main net 1 is made of a rope 11 of which a first part is arranged to form several spaced apart shaped loops each having an inner end portion connected to an outer portion of the fine net 2; fixing elements are used to connect the inner end portions of the shaped loops to the fine net 2. A second part of the rope 11 is arranged across intermediate portions of the shaped loops, approaching the fine net 2. Fixing elements 3 are used to fasten the intersections of the rope 11.

The hooking elements 4 are coupled to an outer portion of the main net 1 for permitting the securing net to be connected to a luggage rack of a station wagon. Thus, the securing net can be fastened to the luggage rack by the hooking elements 4 to secure the luggage on the rack.

From the above description, the securing net of the present invention can be known to be able to secure small objects on the upper part of the luggage, preventing the small objects from filling off the luggage rack.

In a second embodiment of the present invention, the fine net is circular, and is used to replace the central ring 10 of the conventional securing net in the Background for permitting the conventional net to secure small objects on the luggage rack.

What is claimed is:

1. A securing net for luggage, comprising:

a fine net, said fine net centrally disposed in said securing net;

a main net fabricated from a rope, said rope including a first portion arranged to form a plurality of spaced-apart shaped loops, where each one of said plurality of spaced-apart shaped loops includes an inner end portion connected to an outer periphery of said fine net;

said rope further including a second portion arranged so as to cross said shaped loops at intermediate sections thereof forming a plurality of intersections of rope thereby, said second portion further arranged to approach said fine net, wherein said intersections of rope are constrained by fixing elements;

a plurality of hooking elements coupled to an outer periphery of said main net for connecting said securing net to a luggage rack.

2. A securing net for luggage, comprising:

a fine net, said fine net centrally disposed in said securing net;

a main net, said main net including a plurality of transverse ropes and a plurality of radial ropes, wherein said plurality of transverse ropes are disposed around said fine net forming a plurality of closed contours and wherein said radial ropes are attached to an outer periphery of said fine net and extend radially outward to cross said transverse ropes forming a plurality of intersections of rope, said intersections of rope being constrained by fixing elements; and a plurality of hooking elements coupled to an outer periphery of said main net for connecting said securing net to a luggage rack.

\* \* \* \* \*